(12) United States Patent
Mastrobattista (10) Patent No.: US 6,604,296 B2
(45) Date of Patent: Aug. 12, 2003

(54) FRAMING SPEEDSQUARE ATTACHMENT

(76) Inventor: Michael Mastrobattista, 17056 Obsidian Dr., Ramona, CA (US) 92065

( * ) Notice: Subject to any disclaimer, the term of this patent is extended or adjusted under 35 U.S.C. 154(b) by 0 days.

(21) Appl. No.: 09/938,395

(22) Filed: Aug. 23, 2001

(65) Prior Publication Data

US 2003/0037453 A1 Feb. 27, 2003

(51) Int. Cl.$^7$ ................................ B23Q 17/22
(52) U.S. Cl. ..................... 33/640; 33/484; 33/427; 33/414; 33/485; 83/745; 30/293
(58) Field of Search .................. 33/630, 641, 427, 33/429, 452, 464, 474, 476, 481, 482, 484, 485, 628, 640; 83/743, 745, 821, 574, 468.3, 581; 30/293, 294

(56) References Cited

U.S. PATENT DOCUMENTS

| 139,601 | A | * | 6/1873 | Nagle ........................... 33/485 |
| 3,049,956 | A | * | 4/1962 | Lynch ........................... 83/468 |
| 4,435,906 | A | * | 3/1984 | Mori ........................... 33/628 |
| 4,495,709 | A | * | 1/1985 | Mainenti ....................... 33/484 |
| 4,566,200 | A | * | 1/1986 | Brady et al. ................... 33/452 |
| 4,638,564 | A | * | 1/1987 | Burrows ....................... 33/464 |
| 4,702,012 | A |   | 10/1987 | Miller ........................ 33/464 |
| 4,967,482 | A | * | 11/1990 | Hoover et al. ................. 33/427 |
| 5,299,609 | A | * | 4/1994 | Wedler ........................ 33/628 |
| 5,421,093 | A | * | 6/1995 | Davidson ...................... 33/464 |
| 5,813,126 | A |   | 9/1998 | Dahl ........................... 33/474 |
| 5,832,913 | A | * | 11/1998 | Arends ......................... 33/474 |
| D428,348 | S |   | 7/2000 | Hatfield et al. ............... D10/62 |
| 6,393,710 | B1 | * | 5/2002 | Hastings ...................... 33/484 |
| 6,418,830 | B1 | * | 7/2002 | Stumpf et al. ................. 83/581 |
| 2001/0034951 | A1 | * | 11/2001 | Sears .......................... 33/640 |

FOREIGN PATENT DOCUMENTS

| FR | 2660230 A1 | * | 10/1991 | .................. 33/427 |
| JP | 402147301 A | * | 6/1990 | .................. 33/628 |

* cited by examiner

Primary Examiner—Diego Gutierrez
Assistant Examiner—Travis Reis
(74) Attorney, Agent, or Firm—Steins & Associates, P.C.

(57) ABSTRACT

A Framing Speedsquare Attachment is disclosed. Also disclosed is an attachment that includes a segment for slidingly attaching a conventional Speedsquare thereto. The attachment further includes a telescoping extension having a measuring scale on its top surface. Interconnecting the first segment to the telescoping portion is a U-shaped segment that is configured to permit a conventional saw blade to pass through without cutting the attachment. The attachment may also include an anti-jam mechanism to prevent a stop member from pinching a board to be cut. As designed, the attachment provides the user with the ability to make repetitive cuts without the need to use an additional measuring tape nor needing to make cut demarcations on the board to be cut.

16 Claims, 7 Drawing Sheets

FRAMING SPEEDSQUARE ATTACHMENT

BACKGROUND OF THE INVENTION

1. Field of the Invention

Figure 1:
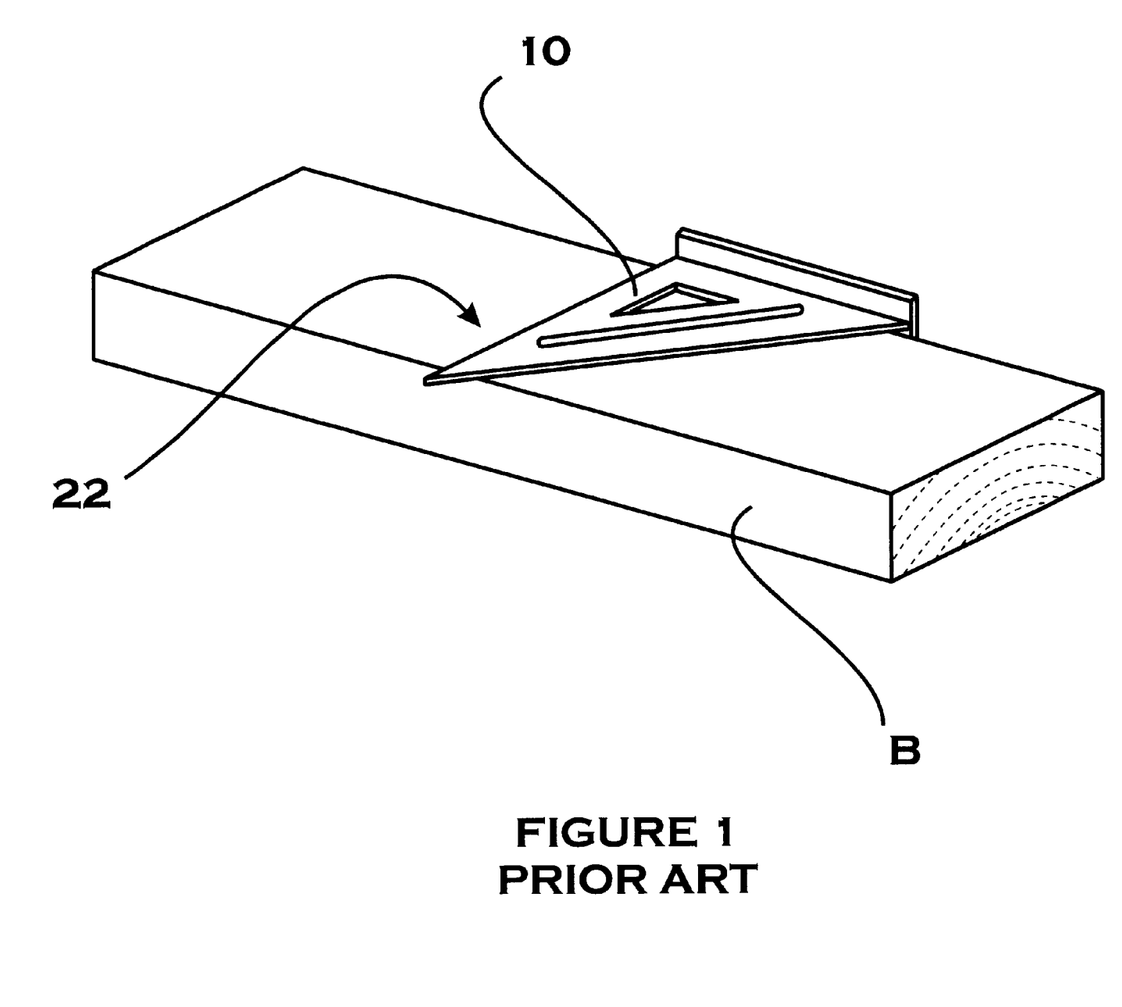
FIG. 1 is a perspective view of a conventional Speedsquare.

This invention relates generally to wood working tools and, more specifically, to a Framing Speedsquare Attachment 2. Description of Related Art The product known as a "SPEEDSQUARE™ 10 Framing Square" is in wide use by virtually every professional framer (individuals whose expertise is in constructing structures from wood framing material). An example of the conventional SPEEDSQUARE™ 10 Framing Square is shown in FIG. 1 and labeled as item 10 therein. The SPEEDSQUARE™ 10 Framing Square is designed to be used to permit a framer to rapidly make precise nuts (typically cross-cuts) in framing material using a conventional electric handheld circular saw. As designed, the user: first, measures and marks the Board B where the cut is to be made; second, places the SPEEDSQUARE™ 10 Framing Square flat on the Board B with the flange 14 against one longitudinal edge of the Board B. Third, once positioned for the correct cut location (as measured and marked), the framer then runs the "fence" or guide of the saw (not shown) along the fence edge 22 of the SPEEDSQUARE™ 10 Framing Square, and the cut is complete and perfectly perpendicular.

On many job sites, it is common to require hundreds of these sorts of cuts on a single day. Unless the crew has a table-top saw, all of the cuts are made as described above using a SPEEDSQUARE™ 10 Framing Square. The problem with making so many cuts with the SPEEDSQUARE™ 10 Framing Square is that the framer needs to set down the saw and SPEEDSQUARE™ 10 Framing Square in between each cut in order to measure for the next cut. This is necessary even when the next length of board to be cut is identical to the one that the framer just made. What is needed, therefore, is a apparatus and method for eliminating or at least minimizing the "tool juggling" that is necessary when using the conventional SPEEDSQUARE™ 10 Framing Square.

Figure 2:
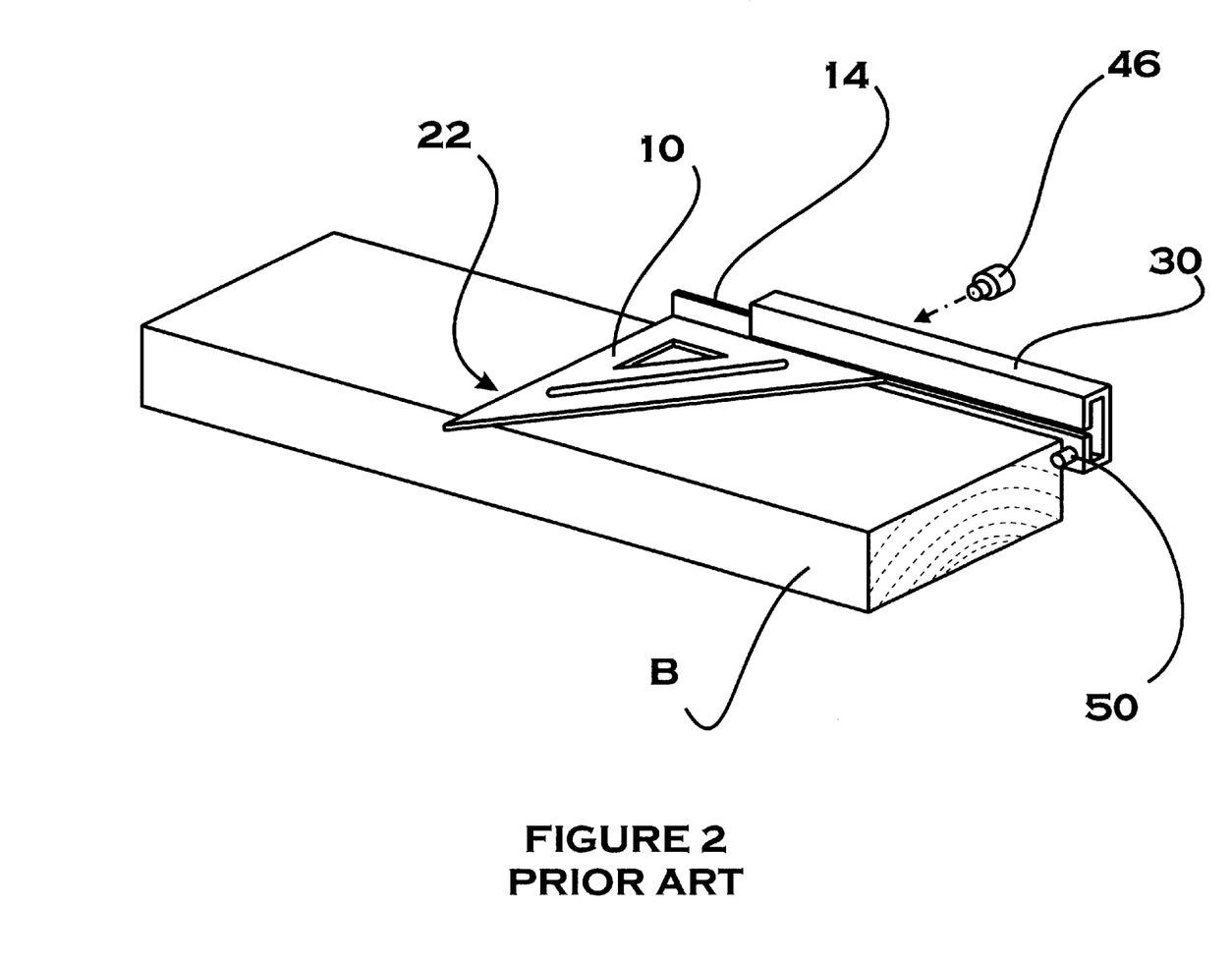
FIG. 2 is a perspective view of a conventional Speedsquare Extension Bar as disclosed by "Dahl;"

Dahl, U.S. Pat. No. 5,813,126 attempted to solve this problem, as depicted in FIG. 2. The Dahl "Speedsquare Extension Bar and Saw Guide" is designed to have a conventional SPEEDSQUARE™ 10 Framing Square inserted into the Bar 30 until the Fence Edge 22 is at the appropriate distance from the Stop Peg 50 screwed into and extending from the end of the bar 30. The SPEEDSQUARE™ 10 Framing Square is then held in this position by screwing in a Thumbscrew 46 from the back side of the Bar 30. Dahl asserts that this will then permit the user to mark multiple Boards B at the identical location along their length, or alternatively to use a handheld circular saw to cut Boards B into sections of identical lengths.

There are at least three problems with Dahl: First, as admitted at the end of Column 2 of Dahl's Specification, "accommodation must be made for the offset between the adjacent edge of the power saw base plate and the saw blade. Second, the Dahl device does not improve upon the SPEEDSQUARE™ 10 Framing Square in that it still necessitates a new measurement (and corresponding tool juggling) each time that a board section of a new length is desired.

Third, the Dahl device requires the user to hold the SPEEDSQUARE™ 10 Framing Square and Extension Bar 30 against the Board B by pushing away from one's self while making the cut (i.e. oriented with the Flange 14 towards the user) in order that the Fence of the conventional saw is against the Fence Edge 22—this is an awkward position that is not common in the field.

What is needed therefore, is an attachment for a conventional SPEEDSQUARE™ 10 Framing Square that provides at least the benefits of Dahl, while further solving the aforementioned problems associated with the Dahl device.

SUMMARY OF THE INVENTION

In light of the aforementioned problems associated with the prior devices and methods, it is an object of the present invention to provide a Framing Speedsquare Attachment. The preferred attachment will include a segment for slidingly attaching a conventional Speedsquare thereto. The attachment should further include a telescoping extension having a measuring scale on its top surface. Interconnecting the first segment to the telescoping portion should be a U-shaped segment that is configured to permit a conventional saw blade to pass through without cutting the attachment. It is another object that the attachment include an anti-jam mechanism to prevent a stop member from pinching a board to be cut. It is yet another object that the attachment provide the user with the ability to make repetitive cuts without the need to use an additional measuring tape nor needing to make cut demarcations on the board to be cut.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, of which:

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a Framing Speedsquare Attachment.

Figure 3:
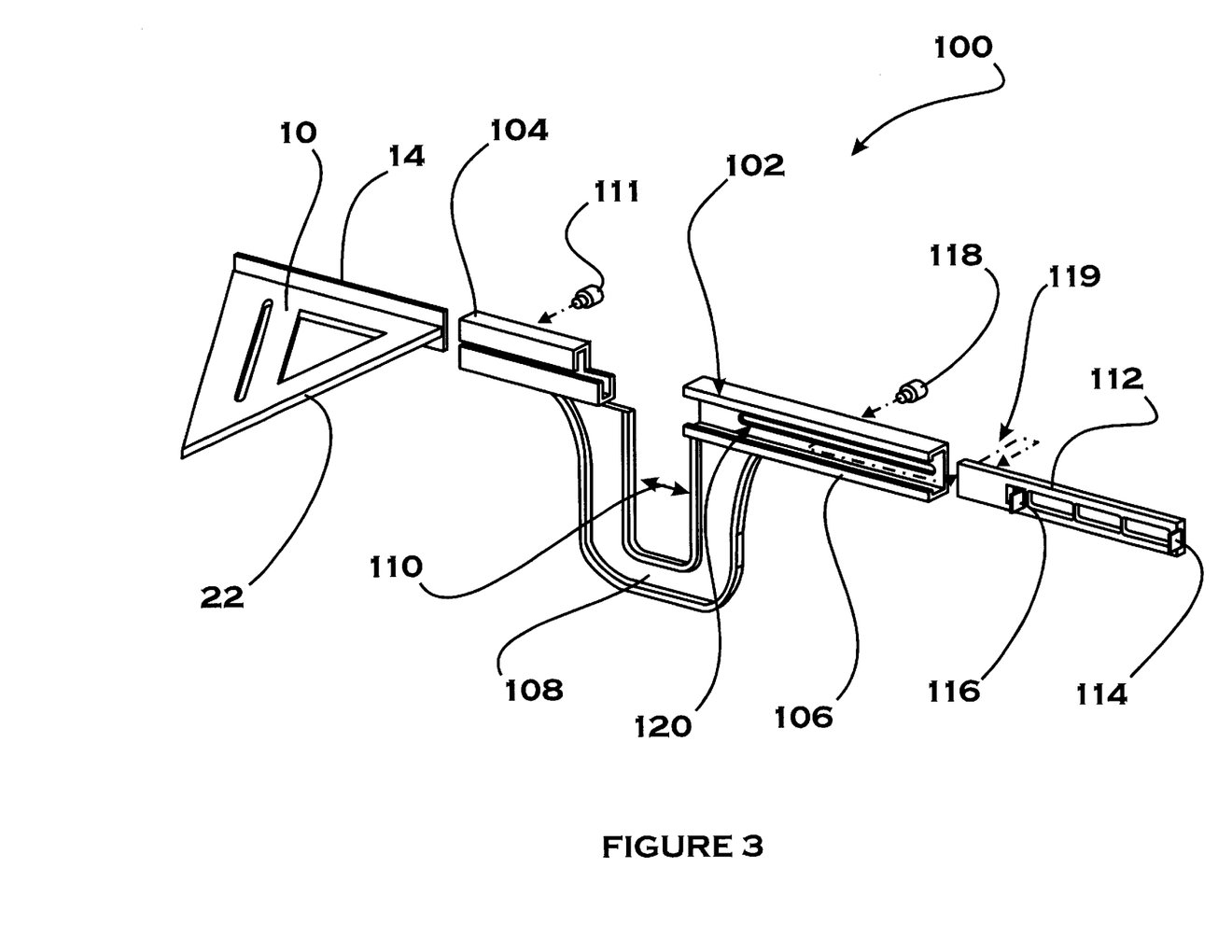
FIG. 3 is an exploded perspective view of a conventional Speedsquare and a preferred embodiment of the Framing Speedsquare Attachment of the present invention.

The present invention can best be understood by initial consideration of FIG. 3. FIG. 3 is an exploded perspective view of a conventional SPEEDSQUARE™ 10 Framing Square, and a preferred embodiment of the Framing Speedsquare Attachment 100 of the present invention. The Attachment 100 comprises two major parts: the Frame Member 102 and the Extension Member 112. The Frame Member 102 includes a First Retaining Channel 104 and a Second Retaining Channel 106, the two channels interconnected by a U-Shaped Segment 108. The First Retaining Channel 104 is configured to slidingly accept the Conventional Speedsquare™ 10 therein. Once the SPEEDSQUARE™ 10 Framing Square is in the desired position within the First Retaining Channel 104, the SPEEDSQUARE™ 10 Framing Square is held in this position by tightening the First Clamp Device 111. As shown here, the First Clamp Device 111 is a threaded knob that screws into the back side of the First Retaining Channel 104, but in other embodiments, other conventional restraint mechanisms might be employed, such as a friction clamp and/or a pin, among others.

The Second Retaining Channel 106 is an elongate channel dimensioned appropriately to slidingly accept the Extension Member 112 therein. The Extension Member 112, once positioned as desired within the Second Retaining Channel 106, is held in place with a Second Clamp Device 118. The Second Clamp Device 118 is of the same family as the First Clamp Device, however, rather than screwing into the Second Retaining Channel 106, it actually passes through the Extension Slot 120 formed within the Second Retaining Channel 106, and then threads into the anti-jam mechanism 119; the anti-jam mechanism 119 is slidingly retained within the Extension Member 112, and is more fully described below in connection with FIG. 7. The Extension Slot permits the Extension Member to be easily and quickly repositioned in a new position.

Protruding from proximate to the distal end of the Extension Member 112 is an End Stop Member 114. The End Stop Member 114 is preferably a structurally stiff tab attached to or otherwise extending out from the front side of the Attachment 100. Also protruding from the Extension Member 112 is an Intermediate Stop Member 116. As will be described more fully below in connection with other figures, the Intermediate Stop Member 116 has two primary orientations: extended and retracted. When a particularly short length of Board needs to be cut, the Intermediate Stop Member 116 can be extended in order to be the Board Stop for the Attachment (similar to the function of Dahl's "Stop Peg"). For longer segments to be cut, the framer can simply fold down or otherwise retract the Intermediate Stop Member 116, and then use the End Stop Member 114 as the Board Stop. This feature give this invention substantial additional utility over the prior designs.

As will be discussed below, the U-Shaped Segment 108 is provided between the First Retaining Channel 104 and the Second Retaining Channel 106 (rather than employing a member that is coaxial with Channels 104 and 106) because the "U" shape provides a Cutting Slot 110. The Cutting Slot 110 provides a path for the blade of the handheld circular saw to pass through so that the framer can hold the Fence 14 of the SPEEDSQUARE™ 10 Framing Square on the far side of the Board when cutting, thereby solving one of the problems associated with the Dahl device.

Regarding preferred materials of construction, the Frame Member 102 and Extension Member 112 will typically be made from either machined or cast metal, however is possible that some other durable and stiff material might be used in some embodiments. The Stop Members 114 and 116 will generally be made from steel for improved durability, stability and accuracy. Now turning to FIG. 4, we can continue to examine the features and operation of this novel SPEEDSQUARE™ 10 Framing Square Attachment 100.

Figure 4:
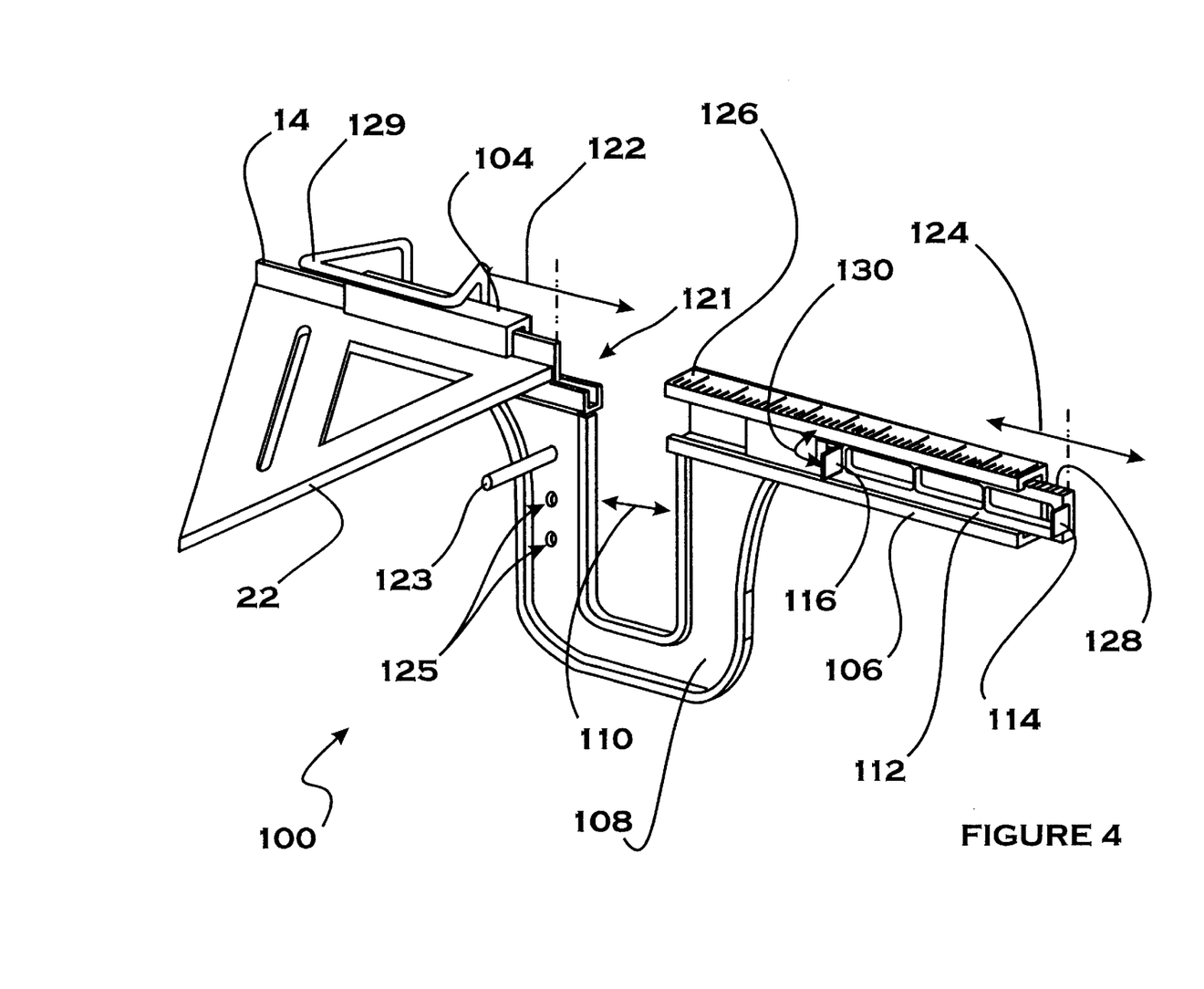
FIG. 4 is a perspective view of the assembled components depicted in FIG. 3.

FIG. 4 is a perspective view of the assembled components depicted in FIG. 3. As explained above, the Intermediate Stop Member 116 can be flipped in and out along arc 130 in order to extend or retract it. Attached or inscribed on the top surface of the Second Retaining Channel 106 is a First Measuring Scale 126. The First Measuring Scale 126 is a series of markings to annotate precision distances down the length of the Second Retaining Channel from left to right (as viewed in this figure). The location of the origin (or zero point) of the First Measuring Scale 126 is actually the proximate end of the extension member 112 when the extension member 112 is retracted completely (such that the proximate end of the extension member 112 is substantially centered within the cutting slot 110. Because the zeroing location and First Measuring Scale 126 are fixed, the user needs simply to adjust and set the SPEEDSQUARE™ 10 Framing Square along the Zero Adjustment Direction 122 until the cutting blade of the handheld circular saw is aligned up against the proximate end of the extension member 112. Once this adjustment is completed for a particular saw design (specifically the saw blade fence design), the SPEEDSQUARE™ 10 Framing Square will not have to be adjusted in the Zero Direction 122 again (unless a new saw is used that has different dimensions).

Because the saw blade is now cutting at the origin of the First Measuring Scale 126, it is a simple matter of aligning either the Intermediate Stop Member 116 or the End Stop Member 114 with the proper length annotation on the First Measuring Scale 126, then placing the Attachment 100 (the SPEEDSQUARE™ 10 Framing Square being captured in the First Retaining Channel) on the Board with the appropriate Stop Member 114 or 116 at the Board's end and then making the cut along the SPEEDSQUARE™ 10 Framing Square Fence Edge 22. In this way, the need for "tool juggling" is eliminated since the measuring and cutting are done with the same tools in hand. Furthermore, as with the Dahl device, repetitive cuts of the same length segment of Board can be done without additional measuring re-setting of the Attachment 100.

An additional feature of the Attachment 100 is the Second Measuring Scale 128. The Second Measuring Scale 128 is attached to or inscribed on the top surface of the Extension Member 112. Unlike the First Measuring Scale 126, the Second Measuring Scale 128 has annotated precision distances down the length of the Extension Member 112 from right to left (as viewed in this figure). The distal end of the Second Measuring Scale 128, therefore, is the beginning of the Scale 128; the proximate end of the Second Measuring Scale 128 is the end of the Scale 128. The Extension Member 112 can be adjusted and set along the Extension Adjustment Direction 124.

An example of how the First and Second Measuring Scales 126 and 128 cooperate is appropriate. Imagine that the distance from the zero location to the distal end of the First Measuring Scale 126 is one foot. Imagine also that the length of the Second Measuring Scale 128 is nine inches. In this scenario, the user would align either the Intermediate or End Stop Member 116 or 122, respectively, with markings along the First Measuring Scale 126 if the Board segment to be cut is between zero and 12 inches long. If, however, the desired Board segment length is between 12 and 21 inches, the user will use the End Stop Member 122 as the Board stop, and will pull out the Extension Member 112 until the appropriate length is revealed on the Second Measuring Scale 128. The unique design and interaction between the First and Second Measuring Scales 126 and 128, then, provide a compact package that will extend to enable users to cut longer segments than the collapsed length of the Attachment 100.

The Notch 121 formed in the top surface of the First Retaining Channel 104 is provided to leave room for the blade guard of the handheld circular saw to pass by the Attachment 100 when cuts are being made. We will now turn to FIG. 5 in order to discuss the critical benefit of the U-shaped segment to the functionality of the Attachment 100.

Also depicted in FIG. 4 is the grasping peg 123 extending from the U-shaped segment 108. The grasping peg 123 performs two duties for the device 100—it is configured to extend beneath the Board upon which the device 100 is resting (see FIG. 5) in order to balance the attachment 100, preventing it from falling off of the Board if the user takes his or her hand from it; the grasping peg 123 also enables the user to easily feed the Board forward after each cut. All that is necessary is for the user to grasp the handle 129 and tilt the attachment (to the right in this depiction) until the Board is pinched between the SPEEDSQUARE™ 10 Framing Square and the grasping peg 123; the user then can pull the Board (to the right in this depiction) until a sufficient amount is extending to the right, after which the user tilts the attachment back to level (and flat against the Board) and slides the appropriate stop member until it is at the end of the Board. The grasping peg 123 is retained in place by inserting it into one of the apertures 125 located along the U-shaped segment 108; the grasping peg can be adjusted for differing thickness of Boards by inserting into one of these alternate apertures 125.

Figure 5:
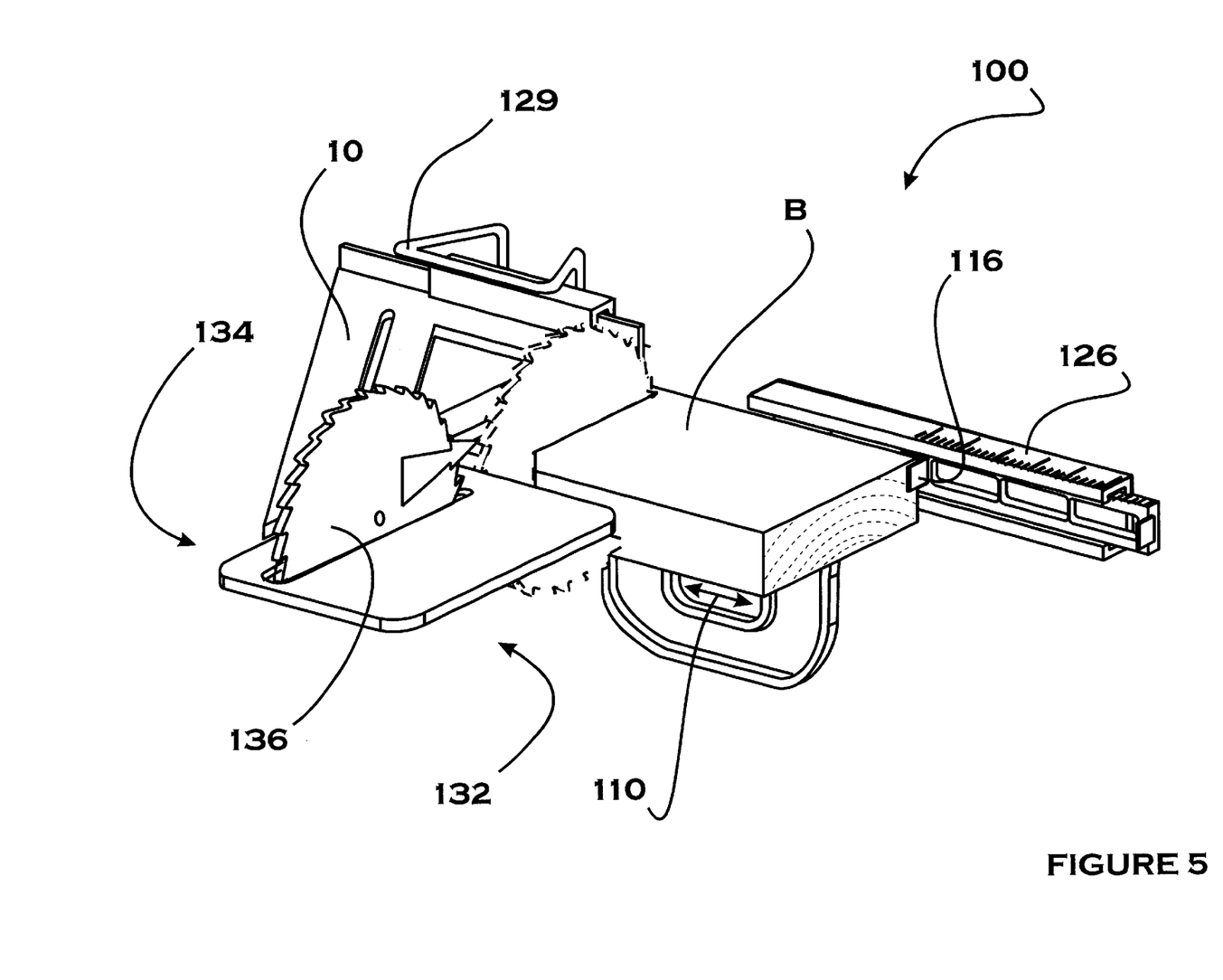
FIG. 5 is a perspective view of the Attachment of FIGS. 3 and 4 in use cutting a board.
Figure 6:
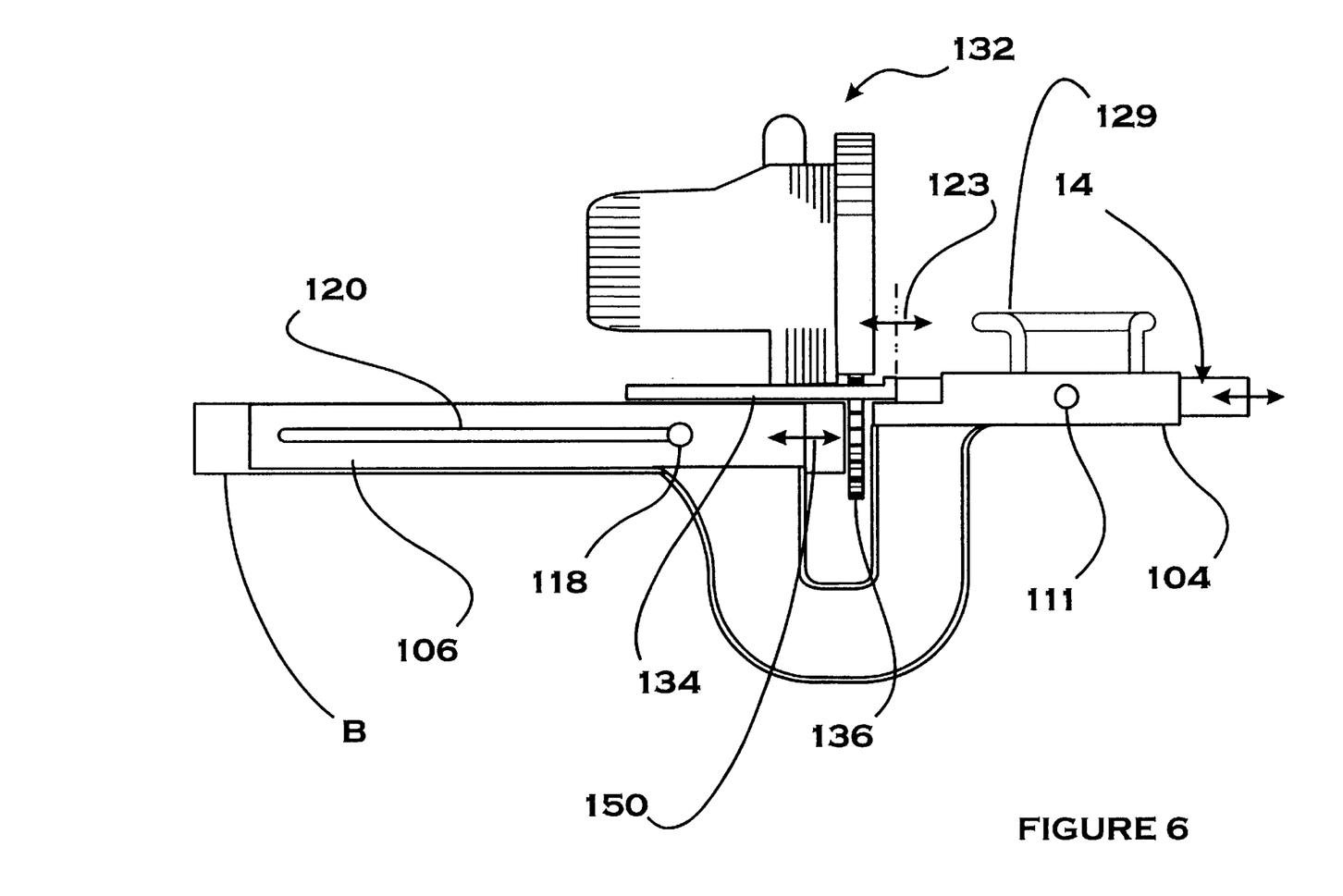
FIG. 6 is a back view of the Attachment of FIGS. 3–5.

FIG. 5 is a perspective view of the Attachment 100 of FIGS. 3 and 4 in use cutting a Board B. In this partial view of the electric hand saw 132, the Blade 136 and Saw Fence 134 are the only components shown, in order to more clearly depict how the cutting slot 110 is used. As shown here, the Attachment 100 has been adjusted such that the Intermediate Stop Member 116 is set to the desired cutting length (i.e. along the First Measuring Scale 126). The Attachment 100 (with the SPEEDSQUARE™ 10 Framing Square attached thereto) is held against the side and end of the Board B, and the Saw 132 is then used to make the cut. The cut is made by running the edge of the Saw Fence 134 against the Fence Edge (see above) of the SPEEDSQUARE™ 10 Framing Square, which will guide the Saw Blade 136 to make the cut exactly aligned with the zero location (assuming that the Attachment 100 has been zeroed for the Saw Fence 134 of this Saw 132). When the cut is made, therefore, the Saw Blade 136 will pass through the Cutting Slot 110, avoiding contact with the Attachment 100. It should be apparent that repetitive cuts using this device will be extremely easy to make. FIG. 6 depicts another view of the zeroing of the Attachment 100 for a particular saw.

FIG. 6 is a back view of die Attachment 100 of FIGS. 3–5. As shown here, the SPEEDSQUARE™ 10 Framing Square is adjusted in direction 123 until the Saw Blade 136 is aligned correctly with the proximate end of the retracted extension member 112 (see FIG. 4). The extension member 112 (see FIG. 4) is retracted by moving it in direction 150 until it reaches it end of travel; the end of the retracted extension member 112 (see FIG. 4) provides the zeroing point for the saw blade 136. The Flange 14 of the SPEEDSQUARE™ 10 Framing Square is then clamped to the First Retaining Channel 104 by tightening the First Clamp Knob 111. After this is completed, it is a simple matter to set the Attachment 100 for the proper cut length—simply loosen the Second Clamp Knob 118 and slide the Extension Member 112 until either the Intermediate or End Stop Member, 116 and 114 respectively, is aligned with the desired length demarkation one of the two Measuring Scales (not shown), and then clamping the Extension Member 112 in position by tightening the Second Clamp Knob 118.

Figure 7:
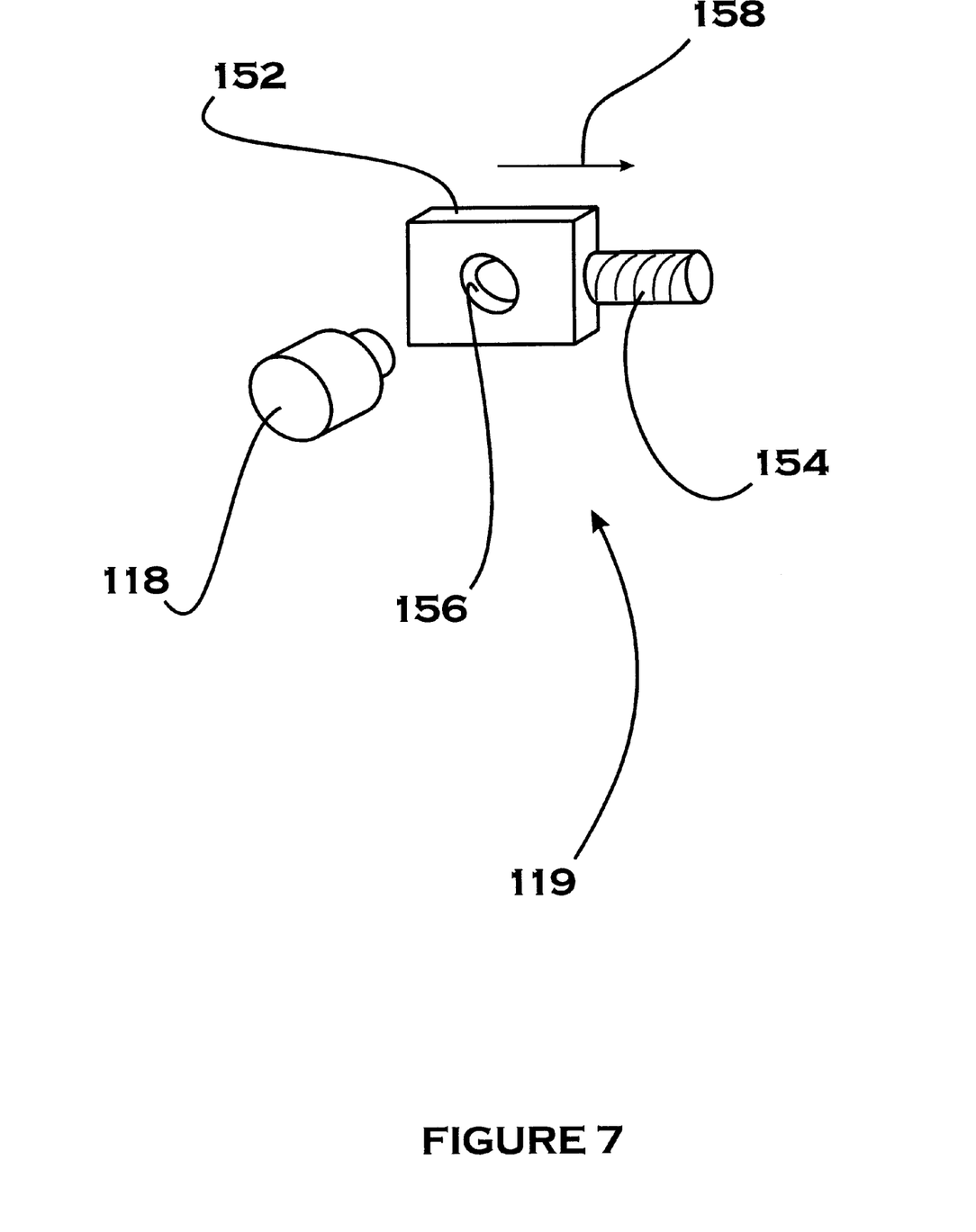
FIG. 7 is an exploded perspective view of a preferred embodiment of an anti-jam mechanism that is incorporated within the Attachment of FIGS. 3–6.

Finally turning to FIG. 7, we can review the specifics of the anti-kick mechanism 119 of the present invention. Essentially, the anti-jam mechanism 119 enables the second clamp knob 118 to give slightly if the saw blade (not shown) ever gets jammed by being pinched within a partially cut board. By allowing slight movement in direction 158, the extension member (not shown) is similarly permitted to move, which will relieve the pinching force on the saw blade (and preventing injury to the user). The mechanism 119 includes a threaded bore 156 formed within a block 152. The block 152 is slidingly retained within the extension member (not shown), and is biased to a stable position by the biasing means 154, such as the spring, shown.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. An attachment for a framing square, the square defined by a triangular base and a flange, the base further defined by fence edge, the attachment comprising:

a frame member defined by a first retaining channel for accepting said framing square flange therein, said channel defining an axis; and an extension member extendable from said frame member substantially parallel to said axis said frame member further comprises a U-shaped segment member defined by a first end and a second end, and said frame member further comprising said first retaining channel extending from said first end; and a second retaining channel extending from said second end, said second retaining channel configured to accept said extension member therein.

2. The attachment of claim 1, wherein said second retaining channel is further defined by a top surface, said attachment further comprising a first measuring scale displayed on said second retaining channel top surface.

3. The attachment of claim 2, wherein said extension member is further defined by a top surface, said attachment further comprising a second measuring scale displayed on said extension member top surface.

4. The attachment of claim 3, further comprising a intermediate stop member and an end stop member extending from said extension member.

5. The attachment of claim 4, wherein said extension member further comprises an anti-jam mechanism.

6. The attachment of claim 5, wherein said first retaining channel is further defined by a notch formed therein.

7. The attachment of claim 4, wherein said anti-jam mechanism comprises a set screw in threaded engagement with a block, said block retained within a pocket formed within said extension member, said anti-jam mechanism further comprising a biasing device for biasing said block against said extension member.

8. A method for cutting board sections, comprising:

attaching a framing square to an attachment defined by a channel with a U-shaped member for accepting said framing square, said channel defining an axis, and an extension member extendable from said frame member substantially parallel to said axis defined by a first end and a second end, and said framing square further defined by a fence;

first positioning the blade of an handheld electric saw against said first end of said extension member, said saw defined by a saw fence;

adjusting the position of said framing square relative to said attachment until said fence is touching said saw fence, whereby the blade of said positioned electric saw is "zeroed";

second positioning said adjusted framing square and attachment combination adjacent to a board for cutting; and cutting said board with said handheld electric saw while sliding said electric saw fence along said framing square fence.

9. The method of claim 8, further comprising the step of adjusting the position of an extension member extending from said attachment prior to said second positioning step.

10. A framing square attachment, comprising:

a frame member defined by a first retaining channel for accepting a framing square, and a second retaining channel; and an extension member extendable from said second retaining channel, substantially parallel to said second retaining channel said frame member further comprises a U-shaped segment member defined by a first end and a second end, and wherein said first retaining channel extends from said first end; and said second retaining channel extends from said second end.

11. The attachment of claim 10, wherein said second retaining channel is further defined by a top surface, said attachment further comprising a first measuring scale displayed on said second retaining channel top surface.

12. The attachment of claim 11, wherein said extension member is further defined by a top surface, said attachment further comprising a second measuring scale displayed on said extension member top surface.

13. The attachment of claim 12, further comprising a intermediate stop member and an end stop member extending from said extension member.

14. The attachment of claim 13, wherein said extension member further comprises an anti-jam mechanism.

15. The attachment of claim 14, wherein said first retaining channel is further defined by a notch formed therein.

16. The attachment of claim 1, further comprising:

a set screw in threaded engagement with said first retaining channel for establishing an intereference fit between said set screw, said framing square flange and said first retaining channel; and a set screw in threaded engagement with said second retaining channel for establishing an interference fit between said second set screw, said extension member and said second retaining channel.

* * * * *